(12) United States Patent
Jones

(10) Patent No.: US 6,489,981 B1
(45) Date of Patent: Dec. 3, 2002

(54) METHOD, ARTICLE OF MANUFACTURE AND APPARATUS FOR PROCESSING SCREEN POINTERS IN A DISPLAY

(75) Inventor: Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 09/644,779

(22) Filed: Aug. 23, 2000

(51) Int. Cl.[7] .................................................. G09G 5/00
(52) U.S. Cl. ........................................ 345/862; 345/858
(58) Field of Search ................................. 345/856–862, 345/157

(56) References Cited

U.S. PATENT DOCUMENTS

| | | | | |
|---|---|---|---|---|
| 4,698,625 A | * | 10/1987 | McCaskill et al. | 345/862 |
| 5,586,243 A | * | 12/1996 | Barber et al. | 345/862 |
| 5,686,937 A | * | 11/1997 | Li | 345/684 |
| 5,736,974 A | * | 4/1998 | Selker | 345/862 |
| 6,016,137 A | * | 1/2000 | Evans et al. | 345/861 |

* cited by examiner

*Primary Examiner*—Mark Zimmerman
*Assistant Examiner*—Paul A. Bell
(74) *Attorney, Agent, or Firm*—Moser, Patterson & Sheridan, LLP; Gero McClellan

(57) ABSTRACT

A method, article of manufacture, and apparatus for processing a first screen pointer and a second screen pointer in a viewable screen area, where the first screen pointer moves in response to user activity. A determination is made as to whether the first screen pointer moves within a predetermined distance of the second screen pointer. If the first screen pointer moves within the predetermined distance of the second screen pointer, at least one of the first screen pointer and the second screen pointer is altered to prevent the second screen pointer from obstructing the first screen pointer.

29 Claims, 6 Drawing Sheets

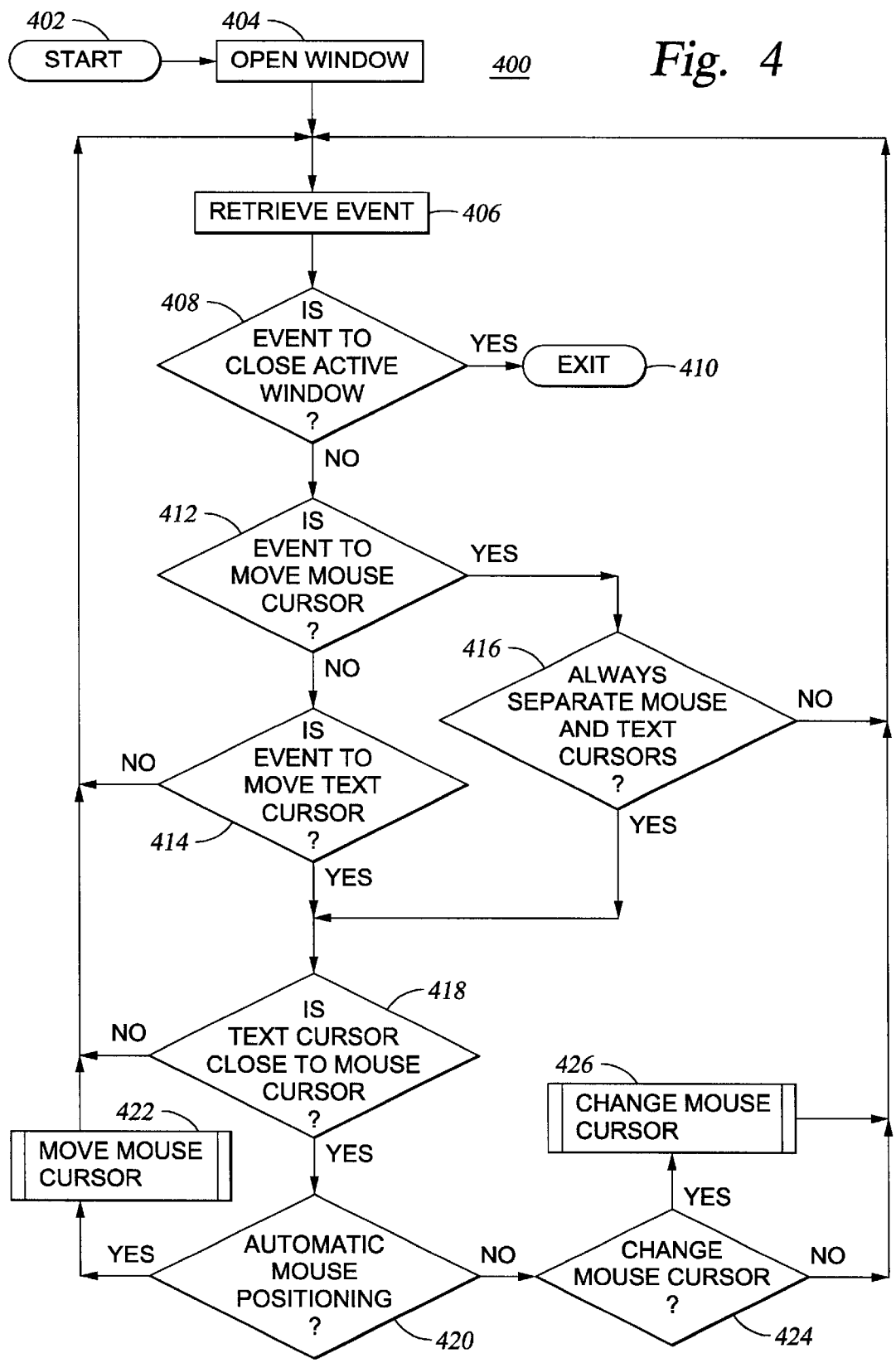

METHOD, ARTICLE OF MANUFACTURE AND APPARATUS FOR PROCESSING SCREEN POINTERS IN A DISPLAY

BACKGROUND OF THE INVENTION

1. Field of the Invention

The invention relates to computers and computer software. More particularly, the invention relates to a method, article of manufacture and apparatus for processing screen pointers in a viewable screen area of a display.

2. Background of the Related Art

Computer systems typically execute a window display program to implement a window environment within a viewable screen area. The window display program generally utilizes screen pointers to indicate user activity in the window environment. Such screen pointers include text cursors and mouse cursors. A text cursor indicates the position in an active window within the viewable screen area in response to user activity, e.g., typing. A mouse cursor similarly indicates the position within the viewable area in response to user activity, e.g., movement of a mouse or input device.

However, a problem arises when the mouse obstructs the text cursor or vice versa, i.e., the text cursor obstructs the mouse cursor. Consider the situation where both the mouse cursor and the text cursor are positioned in the active window. If the user activity is typing, the text cursor moves to indicate the current position of the typing in the active window. As the user continues typing, the text cursor moves closer to the mouse cursor until the mouse cursor obstructs the text cursor. Once the text cursor becomes obstructed by the mouse cursor, the user will become inconvenienced or disrupted from typing in the active window.

Therefore, a need exists for a method, and apparatus for processing two screen pointers, e.g., a text cursor and a mouse cursor, in the viewable screen area such that the one screen pointer does not obstruct the other screen pointer.

SUMMARY OF THE INVENTION

The invention provides a method, article of manufacture and apparatus for processing a first screen pointer and a second screen pointer in a viewable screen area, where the first screen pointer moves in response to user activity. Specifically, the method determines whether the first screen pointer moves within a predetermined distance of the second screen pointer. If first screen pointer moves within the predetermined distance of the second screen pointer, the method alters at least one of the first screen pointer and the second screen pointer to prevent the second screen pointer from obstructing the first screen pointer.

In another embodiment of the invention, an apparatus comprising a memory, a display device and a. processor is provided. The memory stores a window display program. The display device displays a viewable screen area containing a first screen pointer and a second screen pointer, where the first screen pointer moves in the viewable screen area in response to user activity. The processor performs a method upon executing the window display program retrieved from the memory. The method performed determines whether the first screen pointer moves within a predetermined distance of the second screen pointer. If first screen pointer moves within the predetermined distance of the second screen pointer, the method alters at least one of the first screen pointer and the second screen pointer to prevent the second screen pointer from obstruction the first screen pointer.

Additionally, a computer readable medium storing a software program is provided, where the software program, when executed by a computer, causes the computer to perform a method. In one embodiment of the computer readable medium, the method determines whether the first screen pointer moves within a predetermined distance of the second screen pointer. If first screen pointer moves within the predetermined distance of the second screen pointer, the method alters at least one of the first screen pointer and the second screen pointer to prevent the second screen pointer from obstructing the first screen pointer.

BRIEF DESCRIPTION OF THE DRAWINGS

The teachings of the present invention can be readily understood by considering the following detailed description in conjunction with the accompanying drawings, in which:

FIG. 4 depicts a flow diagram of a method for implementing the window display program in accordance to the present invention;

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is directed to processing a first screen pointer and a second screen pointer in an active window of a viewable screen area, where the first screen pointer moves in response to user activity. A determination is made as to whether the first screen pointer moves within a predetermined distance of the second screen pointer. If the first screen pointer moves within the predetermined distance of the second screen pointer, at least one of the first screen pointer and the second screen pointer is altered to prevent the second screen pointer from obstructing the first screen pointer.

Figure 1:
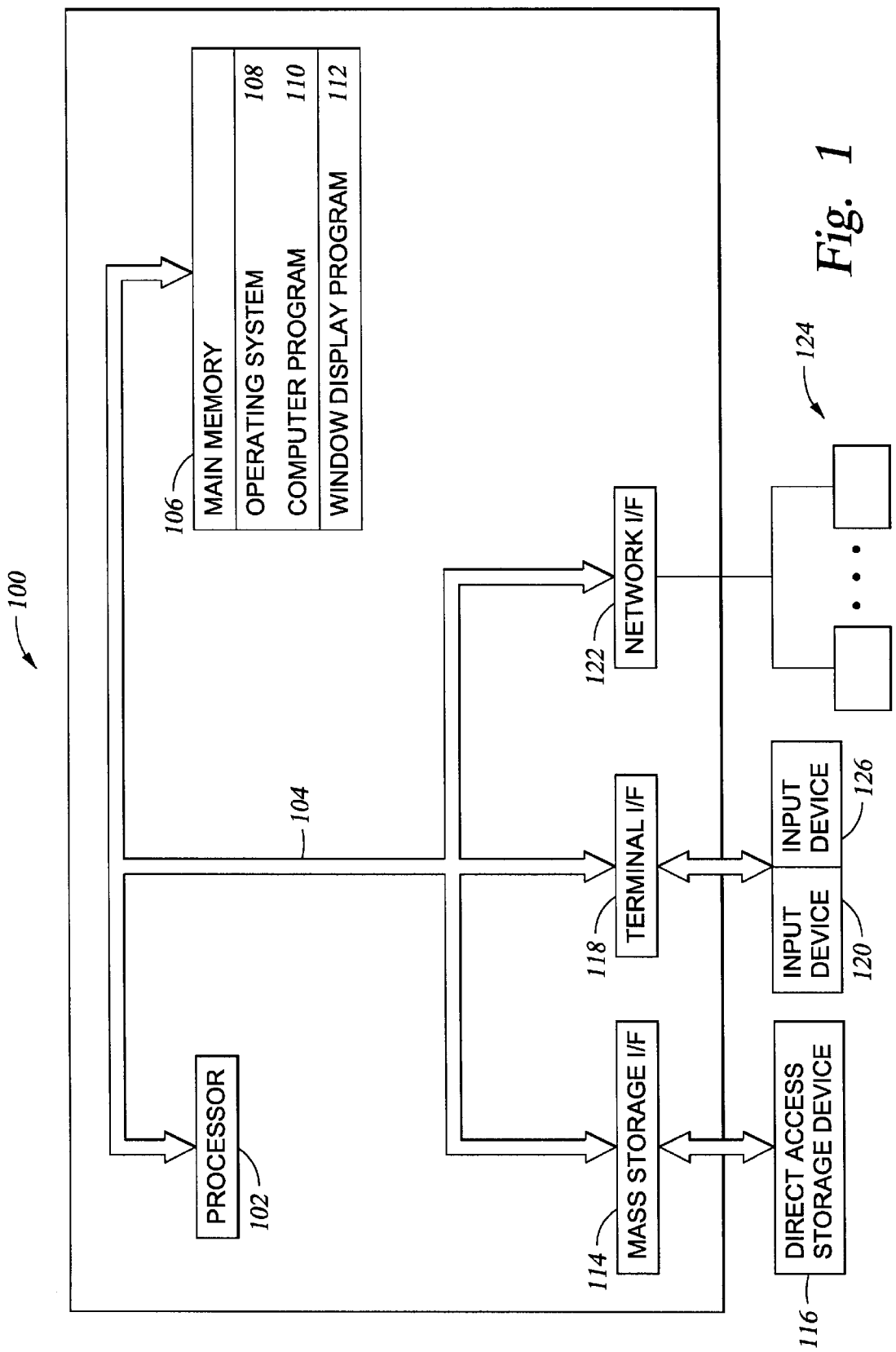
FIG. 1 depicts a high level block diagram of a computer system utilized in the present invention.

FIG. 1 depicts a computer system 100 illustratively utilized in accordance with the invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an AS/400 available from International Business Machines of Armonk, N.Y.

The computer system 100 is shown in a multi-user programming environment having at least one processor 102, which obtains instructions and data via a bus 104 from a main memory 106. Examples of the computer system 100 include a PC-based server, a minicomputer, a midrange computer, a mainframe computer, and other computers adapted to support the methods, apparatus and article of manufacture of the invention.

The main memory 106 includes an operating system 108, a computer program 110, a window display program 112. In addition, the main memory 106 may contain various data structures (not shown). The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. Illustratively, the computer system 100 is coupled to a direct access storage device (DASD) 116, input devices 120, output devices 126, and a plurality of networked devices 124. Each of the peripheral systems is operably coupled to the computer system via respective interfaces. For example, the computer system 100 is coupled to the DASD 116 via a massage storage interface 114, coupled to the input device 120 and the output device 126 via an input/output interface 118, and coupled to the plurality of networked devices 124 via a network interface 122.

The input devices 120 may comprise any device utilized to provide input to the computer system 100. Examples of input devices 120 include a keyboard, a keypad, a light pen, a touch screen, a button, a mouse, a track ball, a speech recognition unit, and the like. The output devices 126 may comprise any conventional display screen. Although shown separately from the input devices 120, the output devices 126 and input devices 120 could be combined. For example, a display screen with an integrated touch screen, and a display with an integrated keyboard, or a speech recognition unit combined with a text speech converter could be used.

In general, the routines executed to implement the embodiments of the invention, whether implemented as part of an operating system or a specific application, component, program, object, module or sequence of instructions will be referred to herein as the window display program 112, or simply as the program 112. The program 112 typically comprises one or more instructions that are resident at various times in various memory and storage devices in the computer system 100. When read and executed by one or more processors 102 in the computer system 100, the program 112 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM, DVD, and the like), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

The window display program 112 prevents a first screen pointer from being obstructed by a second screen pointer in a viewable screen area, where the first screen pointer moves in response to user activity. In one embodiment, the first screen pointer comprises a text cursor and the second screen pointer comprises a mouse cursor (or other pointing device cursor such as a track ball, joy stick, electronic pen and the like). The window display program 112 may be a separate software component of the computer system 100. Alternatively, the window display program 112 may be a subcomponent of the operating system 108 or any other software product executing on the computer system 100.

Figure 2:
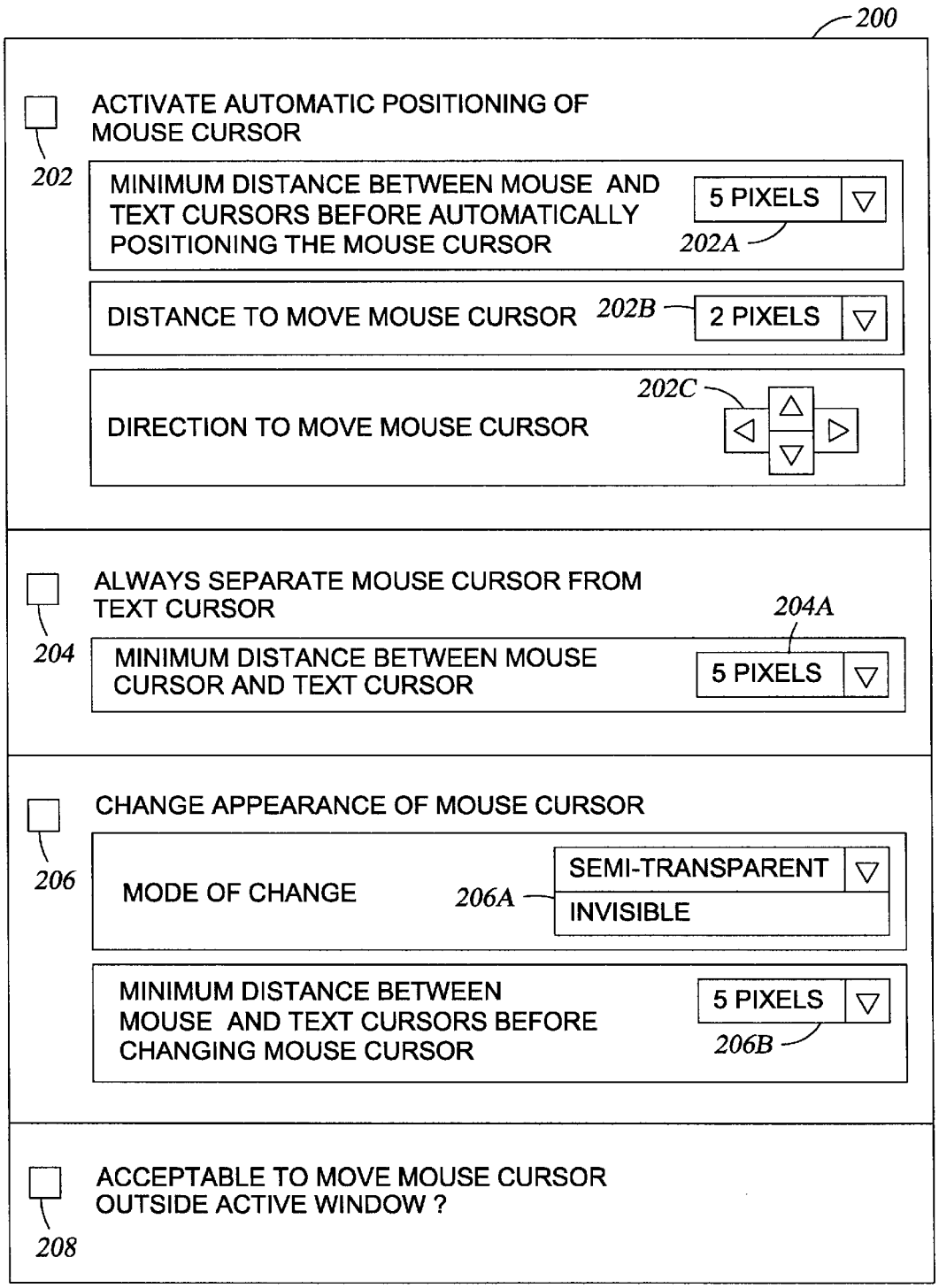
FIG. 2 depicts an illustrative graphical interface utilized to provide user-selectable options in accordance with the present invention.

In one embodiment, the operation of the window display program 112 is at least partially defined by user selected parameters. These parameters may be selected from a graphical user interface (GUI) that is displayed on the output device 126 coupled to the computer system 100. One illustrative GUI 200 is shown in FIG. 2. The GUI 200 is formatted as a window containing multiple checkboxes. In response to selection of one or more checkboxes by a user, the window display program 112 may implement one of more embodiments of the present invention.

The selection of checkbox 202 activates the automatic positioning of a mouse cursor with respect to a text cursor. In accordance with the present invention, the mouse cursor is automatically, positionally adjusted if the text cursor moves within a first predetermined distance of the mouse cursor. Otherwise, the mouse cursor would obstruct a user's view of the text cursor. If checkbox 202 is selected, option window 202A, option window 202B and button assembly 202C become available for user selection. Option window 202A is utilized to specify the (first) predefined distance or a threshold distance between the mouse cursor and the text cursor utilized for initiating the automatic positioning of the mouse cursor by the window display program 112. Such a threshold distance may be defined in terms of pixels, characters and the like. Option window 202B and button assembly 202C are utilized to respectfully specify the distance and direction to move the mouse cursor once the text cursor moves within the distance specified by option window 202A. This movement of the mouse cursor prevents the mouse cursor from obstructing a user's view of the text cursor.

In another embodiment, when checkbox 204 is selected, the mouse cursor is always separated from the text cursor. If checkbox 204 is selected, option window 204A becomes available for user selection. Option window 204A is utilized to specify a minimum distance to separate the mouse cursor and the text cursor. This embodiment is utilized when the mouse cursor moves in response to user activity. Although not shown, options to select the distance and direction to move the mouse cursor are also contemplated within the scope of the invention.

In another embodiment, the selection of checkbox 206 changes the appearance of the mouse cursor on the viewable screen area of the display device 126. This embodiment also prevents the mouse cursor from obstructing the text cursor if the text cursor moves within the (first) predetermined distance of the mouse cursor. If checkbox 206 is selected, option windows 206A and 206B become available for user selection. Option window 206A is utilized to specify the appearance of the mouse cursor. The option window 206A may be utilized to illustratively change the appearance of the mouse cursor to either a semi-transparent or invisible state. Option window 206B defines the threshold distance between the mouse cursor and the text cursor utilized to initiate changing (the appearance of) the mouse cursor. As with checkbox 204, options to select the distance and direction to move the mouse cursor are not shown but also contemplated within the scope of the invention.

If either checkbox 202 or checkbox 206 is selected, the mouse cursor is adjusted, e.g., moved or changed, when the text cursor moves with a predetermined distance of the mouse cursor. The distance is specified with respective option windows 202A and 206A. The selection of checkbox 208 enables the mouse cursor to move outside the active window containing the text cursor. Although shown as a separate checkbox, the checkbox 208 may also be integrated as an option of checkbox 202 or checkbox 204.

It should be understood that the user selectable options described with reference to GUI 200 are merely illustrative. Other user selectable parameters may be provided and used in the present invention. For example, in one embodiment, repositioning of the active window (containing the text cursor) may occur when the text cursor moves within a (first) predetermined distance of the mouse cursor. In another embodiment, once the text cursor moves within the (first) predetermined distance of the mouse cursor, the mouse cursor may be moved outside the active window of the viewable screen area. Additionally, in another embodiment, the appearance of the changed mouse cursor may be restored once the text cursor moves outside a (second) predetermined distance of the mouse cursor.

Figure 3A:
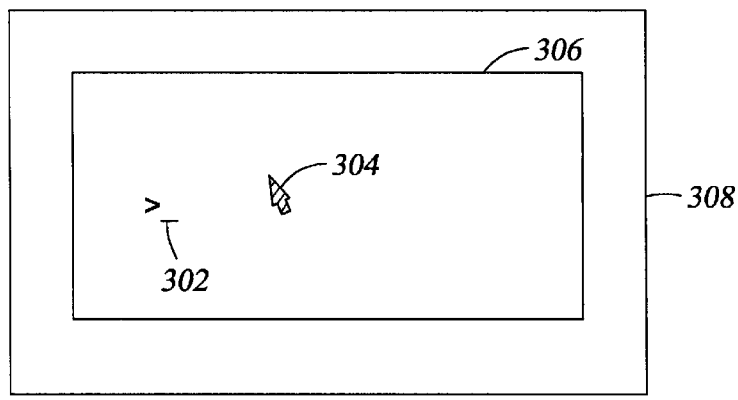
FIG. 3A illustrates an initial position of a text cursor relative to a mouse cursor within an active window.
Figure 3B:
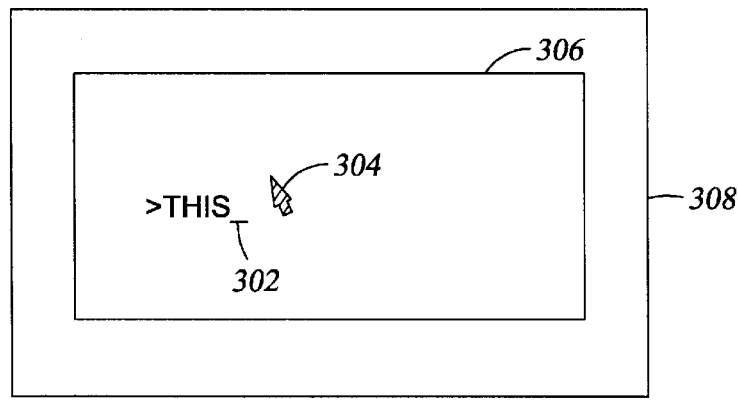
FIG. 3B illustrates movement of a text cursor in response to user activity.

FIG. 3A illustrates an initial position of a text cursor 302 with respect to a mouse cursor. The text cursor 302 is generally contained within an active window 306 of the viewable screen area 308. The mouse cursor 304 is illustratively positioned in the active window 306. However, the mouse cursor 304 may occupy any position in the viewable screen area 308. FIG. 3B illustrates the movement of a text cursor 302 in response to user activity, e.g., a user typing into an input device 120. As the user types text, the text cursor 302 moves closer to the mouse cursor 304.

Figure 3C:
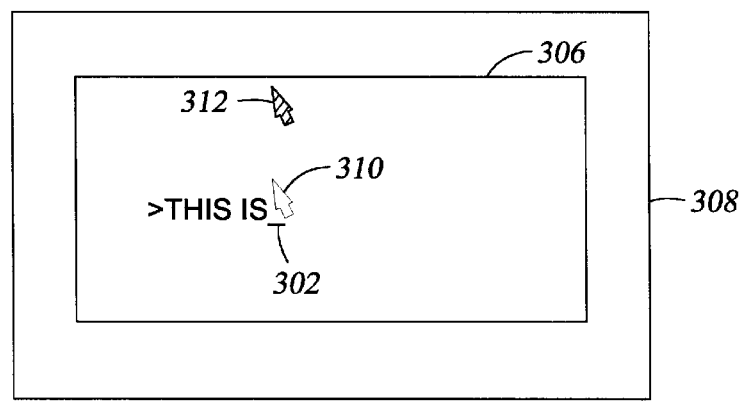
FIG. 3C illustrates the movement of the mouse cursor within the active window in accordance to one embodiment of the present invention.

FIG. 3C illustrates the movement of the mouse cursor 304 within the active window 306 in accordance to one embodiment of the present invention. If the text cursor 302 is allowed to move sufficiently close to the mouse cursor 304, the user's view of the text cursor 302 becomes obstructed by the mouse cursor 304, resulting in an obstructed condition. Accordingly, the present invention takes steps to avoid the obstructed condition by moving one or both of the text cursor 302 and the mouse cursor 304 relative to one another. In the particular application described with reference to FIG. 3C, the mouse cursor 304 is automatically moved from an initial (first) position 310 to another (second) position 312 within the active window 306.

The particular steps taken to resolve the obstructed condition are determined according to the selections made in the GUI 200 described above with reference to FIG. 2. FIG. 3C is an illustration of steps resulting when checkbox 202 has been selected. Accordingly, the movement attributes of the mouse cursor 304 (i.e., distance and direction) are determined by selections made to the option window 202B and the button assembly 202C.

Figure 3D:
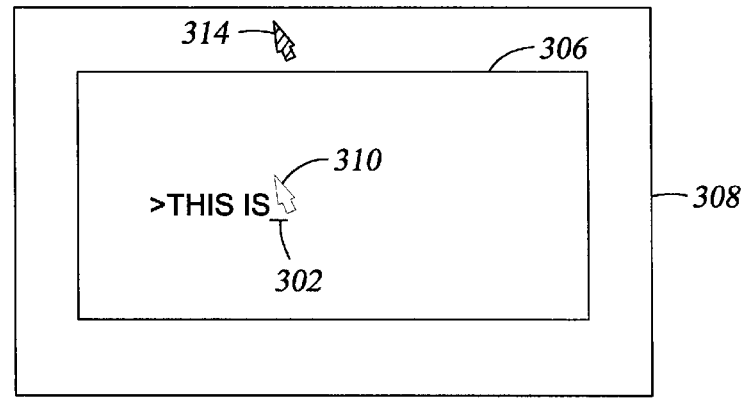
FIG. 3D illustrates the movement of the mouse cursor outside the active window in accordance to another embodiment of the present invention.

Although the mouse cursor 304 is illustratively shown to move upward, the mouse cursor 306 may move in other directions specified in the option window 202B and the button assembly 202C. In this embodiment, the mouse cursor 304 is restrained within the active window 306 by the window display program 112. However, if the checkbox 208 is selected, the mouse cursor 304 may move outside the active window 306. FIG. 3D illustrates the movement of the mouse cursor 304 from a first position 310 inside the active window 306 to a second position 314 outside the active window 306 in accordance to another embodiment of the present invention.

Figure 3E:
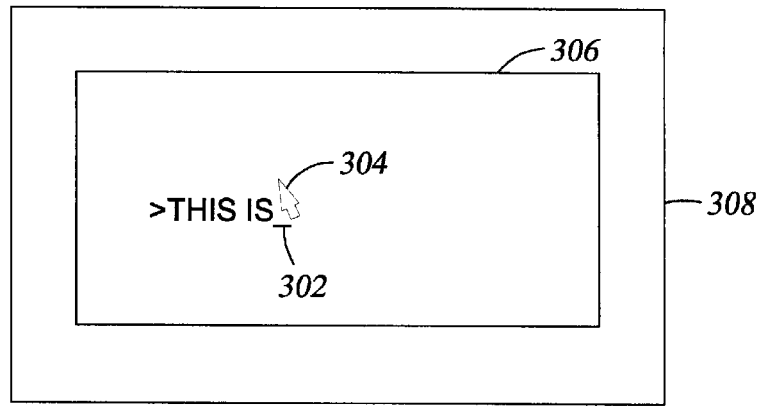
FIG. 3E illustrates a reduced appearance of the mouse cursor in accordance to another embodiment of the present invention.
Figure 3F:
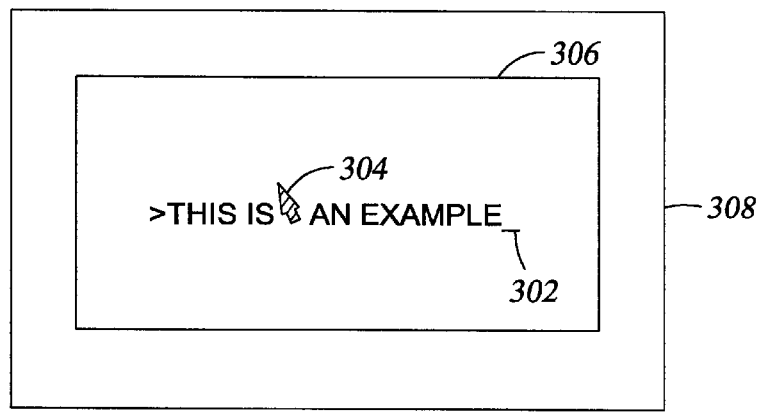
FIG. 3F illustrates a restored appearance of the mouse cursor in accordance to the embodiment of FIG. 3E.

FIG. 3E illustrates the reduced appearance of the mouse cursor 304 in accordance to another embodiment of the present invention. If checkbox 206 is selected, the mouse cursor 304 is adjusted as the text cursor 302 approaches the mouse cursor 304. More specifically, once the distance between the text cursor 302 and the mouse cursor 304 is within the distance specified in option window 206B, the appearance of the mouse cursor 304 is reduced according to option window 206A. In the case where checkbox 206 is selected, the mouse cursor 304 appears semi-transparent or invisible to the user. As with the embodiments in FIG. 3C and FIG. 3D, once the mouse cursor 304 is adjusted, the mouse cursor 304 is prevented from obstructing the text cursor 302 from the user. As the user continues typing or performs some other user activity, the text cursor 302 moves away from the mouse cursor 304. FIG. 3F illustrates the restored appearance of the mouse cursor 304 once the text cursor 302 is no longer in close proximity to the mouse cursor 304. The restoration of the mouse cursor 304 occurs when the text cursor 302 moves outside a (second) predetermined distance from the mouse cursor 304.

Figure 3G:
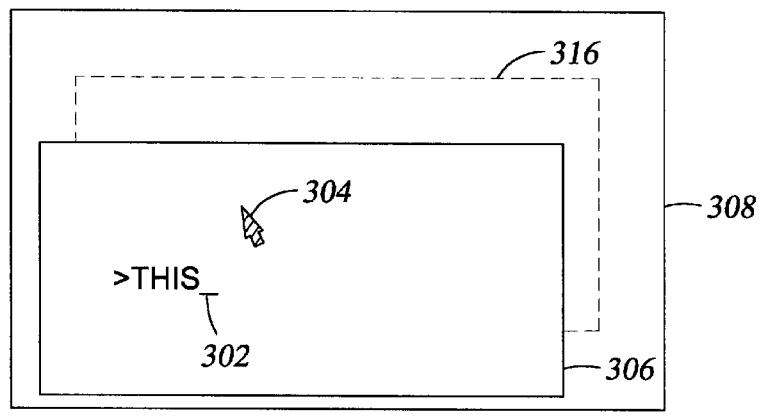
FIG. 3G illustrates movement of the active window and the text cursor in accordance to another embodiment of the present invention.

FIG. 3G illustrates the movement of the active window 306 and the text cursor 302 in accordance with another embodiment of the present invention. Upon sensing the text cursor 302 approaching the mouse cursor 304, the window display program 112 moves the active window 306 from an initial position 316. The text cursor 302 moves with the active window 306, however, the mouse cursor 304 remains stationary with respect to the viewable screen area 308. The active window 306 and text cursor 302 illustratively remain in the viewable screen area 308.

Figure 5:
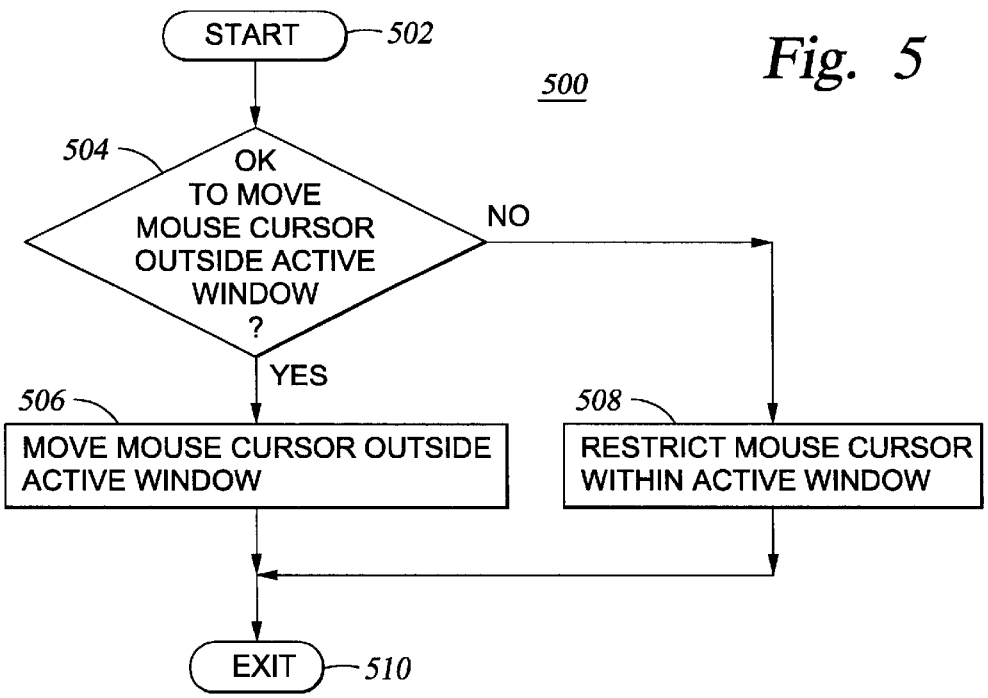
FIG. 5 depicts a flow diagram of a method for moving the mouse cursor in one embodiment of the present invention.
Figure 6:
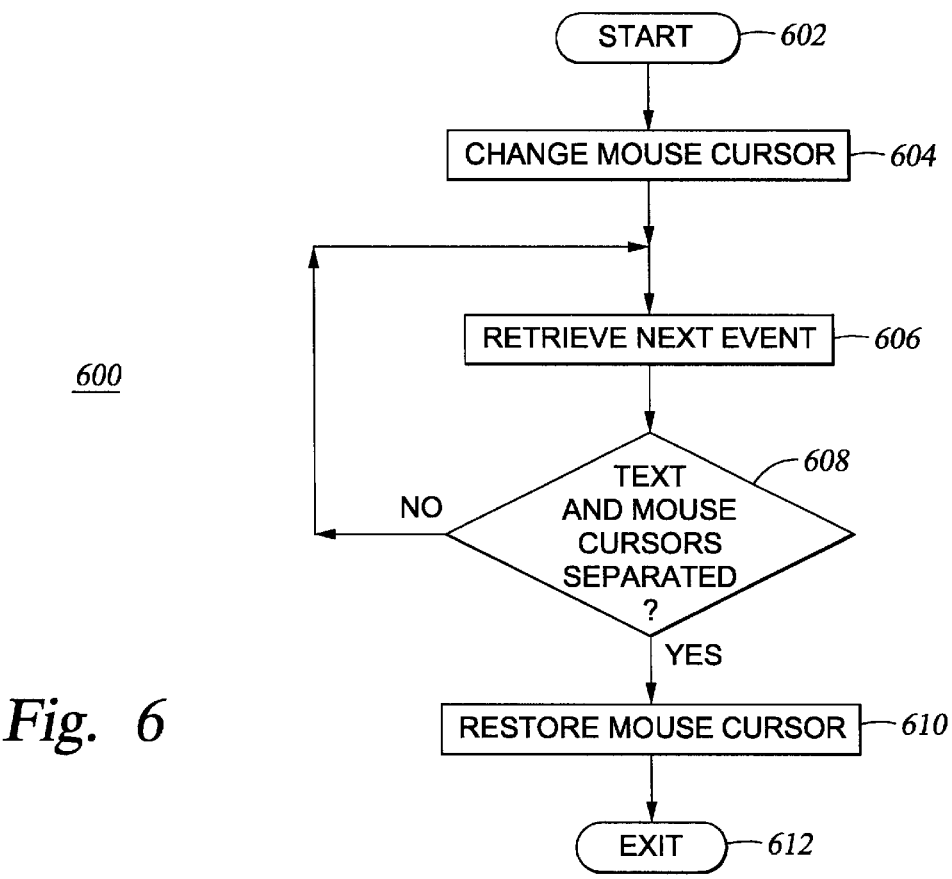
FIG. 6 depicts a flow diagram of a method for changing the mouse cursor in another embodiment of the present invention To facilitate understanding, identical reference numerals have been used, where possible, to designate identical elements that are common to the figures.

FIG. 4 depicts a flow diagram of a method 400 for implementing the window display program 112 in accordance with the present invention. FIG. 5 depicts a flow diagram of a method 500 for moving the mouse cursor in one embodiment of the present invention. FIG. 6 depicts a flow diagram of a method 600 for changing the mouse cursor in another embodiment of the present invention. To best understand the invention, the reader should simultaneously refer to FIGS. 4–6.

Referring to FIG. 4, the method 400 starts at step 402 and proceeds to step 404, where an active window 306 is opened. The method 400 proceeds to retrieve an event at step 406. Such events may represent a particular command from a user, e.g., moving a mouse cursor 304 by moving a mouse 120, or moving a text cursor 302 by typing into a keyboard or some other user activity. The method 400 operates in an event-driven manner, i.e., the method 400 retrieves events and performs different steps depending on a particular event retrieved.

The method 400 proceeds to step 408, where a query determines whether the event is to close the active window 306. If the event is to close the active window 306, the method 400 proceeds to exit at step 410. If the event is not to close the active window 306, the method 400 proceeds to step 412, where a query determines whether the event is to move the mouse cursor 304. If the event is not to move the mouse cursor 304, the method 400 proceeds to step 414, where a query determines whether the event is to move the text cursor 302. If the event is (also) not to move the text cursor, the method 400 returns to retrieve the next event at step 406. If the event is to move the mouse cursor, the method 400 proceeds to step 418.

Returning to step 412, if the event is move the mouse cursor, the method 400 proceeds to step 414, where a query determines whether to always separate the mouse cursor 304 from the text cursor 302. Namely, step 414 determines whether a user has selected the checkbox 204. If the event is not to always separate the mouse cursor 304 from the text cursor 302, the method 400 returns to retrieve the next event at step 406. If the event is to always separate the mouse cursor 304 from the text cursor 302, the method 400 proceeds to step 418. In the case where checkbox 204is selected, the mouse cursor 304 is always separated from the text cursor 302, regardless of whether the text cursor moves or remains stationary within the active window 306.

At step 418, a query determines whether the text cursor 302 is (separated) within a predetermined distance from the mouse cursor 304. For example, step 418 may determine whether the text cursor 302 has moved to within a predetermined distance of the mouse cursor 304. If the text cursor 302 is not within the predetermined distance of the mouse cursor 304, the method 400 returns to retrieve the next event at step 406. If the text cursor 302 is within the predetermined distance from the mouse cursor 304, the method 400 proceeds to step 420, where a query determines whether to perform automatic positioning of the mouse cursor 304. Namely step 420 determines whether a user has selected the checkbox 202.

If automatic positioning of the mouse cursor 304 is to be performed, the method 400 proceeds to step 422, where the mouse cursor is moved in accordance with the present invention. Step 422 is embodied in a method 500 described below with respect to FIG. 5. After moving the mouse cursor 304 at step 422, the method 400 returns to retrieve the next event at step 406.

If automatic positioning of the mouse cursor 304 is not to be performed, the method 400 proceeds to step 424, where a query determines whether to change, e.g., reduce, the appearance of the mouse cursor 304 in the viewable screen area. Namely, step 424 determines whether the user has selected the checkbox 206. If the appearance of the mouse cursor 304 is not to be changed, the method 400 returns to retrieve the next event at step 406. If the appearance of the mouse cursor 304 is to be changed, the method 400 proceeds to step 426, where the mouse cursor 304 is changed in accordance with the present invention. Step 426 is embodied in a method 600 described below with respect to FIG. 6. After changing the mouse cursor 304 at step 426, the method 400 returns to retrieve the next event at step 406.

Although the foregoing method 400 was described in the context of adjusting, e.g., moving or reducing the appearance of, the mouse cursor 304, the method 400 may similarly apply to move the active window 306 and the text cursor 302 when the text cursor 302 moves within a predetermined distance of the screen cursor 304.

Referring to FIG. 5, the method is entered from step 422. More specifically, the method 500 starts at step 502 and proceeds to step 504, where a query determines whether the mouse cursor 304 is allowed to move outside the active window 306. Namely, step 504 determines whether the user has selected the checkbox 208. If the mouse cursor 304 is allowed to move outside the active window 306, the method 500 proceeds to step 506, where the mouse cursor 304 is automatically moved outside the active window 306.

If the mouse cursor 304 is not allowed to move outside the active window 306, the method 500 proceeds to step 508, where the mouse cursor 304 is moved within the active window 306 in accordance with a set of default preferences. For example, if moving the mouse cursor 304 in a downward direction would move the mouse cursor 304 outside the active window 306, the window display program 112 may move the mouse cursor 304 in an opposite direction. In this manner, the mouse cursor 304 would then remain within the active window 306. After the mouse cursor is moved in either step 506 or step 508, the method 500 proceeds to exit at step 510, i.e., returns to step 422.

Referring to FIG. 6, the method 600 is entered from step 426. More specifically, the method 600 starts at step 602 and proceeds to step 604, where the appearance of the mouse cursor 304 is changed in accordance to option window 206A. For example, the mouse cursor 304 may be changed to appear semi-transparent or invisible to the user. After changing the mouse cursor in step 604, the method 400 proceeds to step 606, where the next event, e.g., movement of the text cursor 302 in response to user typing, is retrieved.

At step 608, a query determines whether the text cursor 302 has moved away, e.g., in response to typing, from the mouse cursor 304. Namely, step 608 determines whether the text cursor 302 has moved outside a (second) predetermined distance of the mouse cursor 304. If the text cursor 302 has not yet moved away from the mouse cursor 304, the method 600 returns to retrieve the next event at step 606. If the text cursor 302 has moved away from the mouse cursor 304, the method 600 proceeds to step 610, where the appearance of the mouse cursor 304 is restored. After this step 610, the method 600 exits at step 612, i.e., returns to step 426.

While the foregoing is directed to the specific embodiment of the present invention, other and further embodiments of the invention may be devised without departing from the basic scope thereof, and the scope thereof is determined by the claims that follow.

What is claimed is:

1. A method for processing a first screen pointer and a second screen pointer in an active window of a viewable screen area, where the first screen pointer moves in response to user activity, the method comprising:

determining whether the first screen pointer moves within a threshold number of characters of the second screen pointer; and altering at least one of the first screen pointer and the second screen pointer if the first screen pointer moves within the threshold number of characters of the second screen pointer.

2. A method for processing a text cursor and a mouser pointer in an active window of a viewable screen area, the method comprising:

determining whether the text cursor moves within a first predetermined distance of the mouse pointer, and altering at least one of the text cursor and the mouse pointer If the text cursor moves within the first predetermined distance of the mouse pointer.

3. A method for processing a first screen pointer and a second screen pointer in an active window of a viewable screen area, where the first screen pointer moves in response to user activity, the method comprising:

determining whether the first screen pointer moves within a first predetermined distance of the second screen pointer; and moving the second screen pointer from a first position in the active window to a second position in the active window if the first screen pointer moves within the first predetermined distance of the second screen pointer.

4. A method for processing a first screen pointer and a second screen pointer in an active window of a viewable screen area, where the first screen pointer moves in response to user activity, the method comprising:

determining whether the first screen pointer moves within a first predetermined distance of the second screen pointer; and moving the second screen pointer from a first position in the active window to a second position outside of the active window if the first screen pointer moves within the first predetermined distance of the second screen pointer.

5. A method for processing a first screen pointer and a second screen pointer in an active window of a viewable screen area, where the first screen pointer moves in response to user activity, the method comprising:

determining whether the first screen pointer moves within a predetermined distance of the second screen pointer; and altering at least one of the first screen pointer and the second screen pointer if the first screen pointer moves within the predetermined distance of the second screen pointer, wherein altering comprises moving the active window containing the first screen pointer, where the first screen pointer is moved from a first position in the viewable screen area to a second position in the viewable screen area.

6. A method for processing a first screen pointer and a second screen pointer in an active window of a viewable screen area, where the first screen pointer moves in response to user activity, the method comprising:

determining whether the first screen pointer moves within a predetermined distance of the second screen pointer; and making the second screen pointer appear semi-transparent to a user viewing the viewable screen area if the first screen pointer moves within the predetermined distance of the second screen pointer.

7. A method for processing a text cursor and a mouser pointer in an active window of a viewable screen area, the method comprising:

determining whether the mouse pointer moves within a predetermined distance of the text cursor; and moving the mouse pointer from a first position in the active window to a second position in the active window if the mouse pointer moves within the predetermined distance of the text cursor.

8. An apparatus for processing a first screen pointer and a second screen pointer in an active window of a viewable screen area, the apparatus comprising:

a memory for storing a window display program;

a display device for displaying the first screen pointer and the second screen pointer in the active window of the viewable screen area, where the first screen pointer moves in the viewable screen area in response to user activity, and a processor, coupled to the memory and the display device, for performing an operation upon executing the window display program retrieved from the memory, the operation comprising:

determining whether the first screen pointer is within a threshold number of characters from the second screen pointer; and altering at least one of the first screen pointer and the second screen pointer if the first screen pointer is within a threshold number of characters from the second screen pointer.

9. An apparatus for processing a text cursor and a mouse pointer in an active window of a viewable screen area, the apparatus comprising:

a memory for storing a window display program;

a display device for displaying the text cursor and the mouse pointer in the active window of the viewable screen area; and a processor, coupled to the memory and the display device, for performing an operation upon executing the window display program retrieved from the memory, the operation comprising:

determining whether the text cursor moves within a predetermined distance of the mouse pointer; and altering at least one of the text cursor and the mouse pointer if the text cursor moves within the predetermined distance of the mouse pointer.

10. A computer readable medium storing a software program that, when executed by a processor of a computer, causes the computer to perform an operation comprising:

determining whether a first screen pointer moves within a threshold number of characters of a second screen pointer within an active window of a viewable screen area, where the first screen pointer moves in response to user activity; and altering at least one of the first screen pointer and the second screen pointer if the first screen pointer moves within the threshold number of characters of the second screen pointer.

11. A computer readable medium storing a software program that, when executed by a processor of a computer, causes the computer to perform an operation comprising:

determining whether a text cursor moves within a predetermined distance of a mouse pointer within an active window of a viewable screen area, where the text cursor moves in response to user activity; and altering at least one of the text cursor and the mouse pointer if the text cursor moves within the predetermined distance of characters of the mouse pointer.

12. A computer readable medium storing a software program that, when executed by a processor of a computer, causes the computer to perform an operation comprising:

determining whether the first screen pointer moves within a predetermined distance of the second screen pointer within an active window of a viewable screen area, where the first screen pointer moves in response to user activity; and moving the second screen pointer from a first position in the active window to a second position in the active window if the first screen pointer moves within the predetermined distance of the second screen pointer.

13. A computer readable medium storing a software program that, when executed by a processor of a computer, causes the computer to perform an operation comprising:

determining whether the first screen pointer moves within a predetermined distance of the second screen pointer within an active window of a viewable screen area, where the first screen pointer moves in response to user activity; and moving the second screen pointer from a first position in the active window to a second position outside of the active window if the first screen pointer moves within the predetermined distance of the second screen pointer.

14. A computer readable medium storing a software program that, when executed by a processor of a computer, causes the computer to perform an operation comprising:

determining whether the first screen pointer moves within a predetermined distance of the second screen pointer within an active window of a viewable screen area, where the first screen pointer moves in response to user activity; and altering at least one of the first screen pointer and the second screen pointer if the first screen pointer moves within the predetermined distance of the second screen pointer, wherein altering comprises moving the active window containing the first screen pointer, where the first screen pointer is moved from a first position in the viewable screen area to a second position in the viewable screen area.

15. A computer readable medium storing a software program that, when executed by a processor of a computer, causes the computer to perform an operation comprising:

determining whether the first screen pointer moves within a predetermined distance of the second screen pointer within an active window of a viewable screen area, where the first screen pointer moves in response to user activity; and making the second screen pointer appear semi-transparent to a user viewing the viewable screen area if the first screen pointer moves within the predetermined distance of the second screen pointer.

16. A computer readable medium storing a software program that, when executed by a processor of a computer, causes the computer to perform an operation comprising:

determining whether a mouse pointer moves within a predetermined distance of a text cursor within an active window of a viewable screen area; and moving the mouse pointer from a first position in the active window to a second position in the active window if the mouse pointer moves within the first predetermined distance of the text cursor.

17. A method for processing a first screen pointer and a second screen pointer in an active window of a viewable screen area, where the first screen pointer moves in response to user activity, the method comprising:

determining whether the first screen pointer moves within a first predetermined distance of the second screen pointer; and altering at least one of the first screen pointer and the second screen pointer if the first screen pointer moves within the first predetermined distance of the second screen pointer; whereby the second screen pointer is prevented from obstructing a user's view of the first screen pointer.

18. The method of claim 17, wherein the step of altering comprises:

changing the appearance of the second screen pointer in the viewable screen area.

19. The method of claim 18, wherein the step of changing comprises:

making the second screen pointer appear invisible to a user viewing the viewable screen area.

20. The method or claim 18, further comprising:

restoring the appearance of the second screen pointer when the first screen pointer moves outside a second predetermined distance of the second screen pointer.

21. The method of claim 17 wherein the first screen pointer comprises a text cursor and the second screen pointer comprises a mouse cursor.

22. An apparatus for processing a first screen pointer and a second screen pointer in an active window of a viewable screen area, the apparatus comprising:

a memory for storing a window display program:

a display device for displaying the first screen pointer and the second screen pointer in the active window of the viewable screen area, where the first screen pointer moves in the viewable screen area in response to user activity, and a processor, coupled to the memory and the display device, for performing an operation upon executing the window display program retrieved from the memory, the operation comprising:

determining whether the first screen pointer moves within a first predetermined distance of the second screen pointer; and altering at least one of the first screen pointer and the second screen pointer if the first screen pointer moves within the first predetermined distance of the second screen pointer; whereby the second screen pointer is prevented from obstructing a user's view of the first screen pointer.

23. The apparatus of claim 22 wherein the step of altering comprises:

changing the appearance of the second screen pointer in the viewable screen area.

24. The apparatus of claim 22 wherein the first screen pointer comprises a text cursor and the second screen pointer comprises a mouse cursor.

25. A computer readable medium storing a software program that, when executed by a processor of a computer, causes the computer to perform an operation comprising:

determining whether the first screen pointer moves within a first predetermined distance of the second screen pointer within an active window of a viewable screen area, where the first screen pointer moves in response to user activity; and altering at least one of the first screen pointer and the second screen pointer if the first screen pointer moves within the first predetermined distance of the second screen pointer; whereby the second screen pointer is prevented from obstructing a user's view of the first screen pointer.

26. The computer readable medium of claim 25 wherein the step of altering comprises:

changing the appearance of the second screen pointer in the viewable screen area.

27. The computer readable medium of claim 26 wherein the step of changing comprises:

making the second screen pointer appear invisible to a user viewing the viewable screen area.

28. The computer readable medium of claim 26 wherein the operation further comprises:

restoring the appearance of the second screen pointer when the first screen pointer moves outside a second predetermined distance of the second screen pointer.

29. The computer readable medium of claim 25, wherein the first screen pointer comprises a text cursor and the second screen pointer comprises a mouse cursor.

* * * * *